*Inventor*
L.Lewin-Y.Klinger
*By* [signature]
*Attorney*

United States Patent Office 3,013,217
Patented Dec. 12, 1961

3,013,217

MASER TYPE OSCILLATOR

Leonard Lewin and Yehuda Klinger, London, England, assignors to International Standard Electric Corporation, New York, N.Y.

Filed Apr. 17, 1959, Ser. No. 807,164
Claims priority, application Great Britain Apr. 30, 1958
2 Claims. (Cl. 331—94)

This invention relates to what are now commonly known as "maser" devices, the noun "maser" being formed from the principal initial letters in the phrase "microwave amplification by stimulated emission of radiation," and the devices themselves making use of internal molecular-resonance or other quantum-transition phenomena in a mass of material in solid or gaseous state. Such devices can be utilised as oscillators or amplifiers of microwave or higher frequency, and have the special advantage of high frequency stability, the frequency determining factor being inherent in the molecules comprised in a substance without regard to dimensions or shape of that substance.

The main object of the present invention is to provide a maser device in which a suitable material is irradiated by continuous wave energy of such frequency content as to produce an overall change of energy level greater than that corresponding to any one component frequency of the irradiating energy, and in which the frequency of the stimulated emission of radiation is different from that of any one of said components and may be higher than the highest component frequency of the irradiating energy.

In order to achieve this object there is provided, according to the present invention, a maser device comprising a body of crystalline material having a plurality of at least four quantum-transition energy levels such that energy transitions between said levels are permissible, means for irradiating said body by continuous wave energy of frequency content such as to set up energy transition between the lowest and the highest of said levels in a plurality of steps which leave unaffected at least an intermediate one of said levels, and means for selecting the resultant stimulated emission of energy of frequency equal to the transition frequency between said highest level and said one intermediate level.

Figure 1:
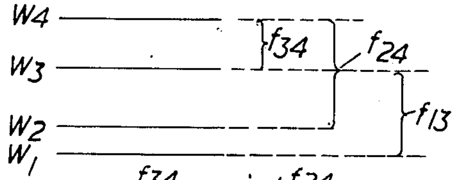
Figure 2:
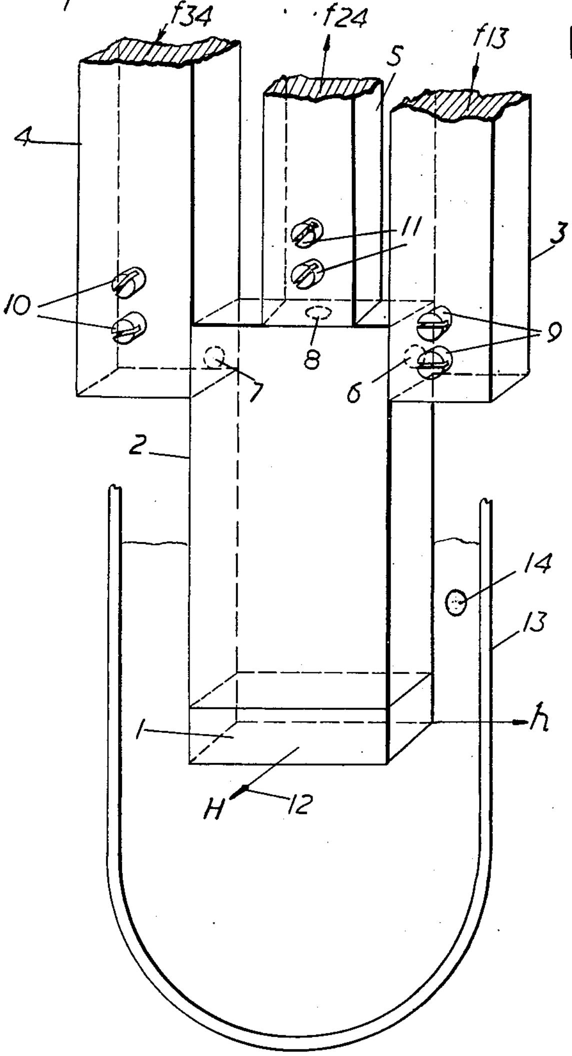

The invention will be better understood from the following general discussion, together with a description of a particular embodiment illustrated in the accompanying drawing, in which:

FIG. 1 is a conventional energy-level diagram referred to in explanation of the operation of the invention; and FIG. 2 is a diagrammatic representation of the essential elements of a maser oscillator embodying the principles of the invention.

Referring to FIG. 1, this shows in conventional fashion four lines indicative of various internal quantum-transition energy states or "levels" which may be assumed by a particular substance when suitably excited. For convenience these levels are designated $W_1$, $W_2$, $W_3$ and $W_4$, the magnitudes of the energy levels increasing sequentially from $W_1$ to $W_4$. According to the quantum laws, the energy states or levels can be changed only in discrete steps from one to another of the levels indicated in FIG. 1, i.e. the change can only be made in a jump, this jump being accompanied by either absorption or emission of a photon of electromagnetic wave energy of frequency fixed by the difference between the energy levels between which the jump has been made. For convenience such a transition frequency is hereinafter indicated by expressions of the type "$f_{12}$," where the suffix numerals 1 and 2 indicate that the transition has been made between levels $W_1$ and $W_2$. The transition involves the absorption of energy if the jump is from a low level such as $W_1$ to a high level such as $W_3$, and the emission of energy if the jump is in the reverse direction.

If a solid body, or a confined volume of gas, comprises a large number of like molecules which are collectively in a state of thermal equilibrium, the molecules with their constituent particles do not all take up the same energy level. Calling the number of particles characterised by any particular energy level the "population" of that level, so that the total number of particles is constituted by the sum of the populations of the different levels, then the population of any given one of the characteristic levels is less than that of any of the lower levels and greater than that of any of the higher levels. No useful emission can be obtained from such a distribution. If, however, it is arranged that the population ratio of two of the levels is inverted or at least modified so that there are more particles in the higher level than in the lower, useful energy will be emitted at the transition frequency appropriate to jumps between the two levels in question.

There is already known a maser device which makes use of three energy levels in a solid paramagnetic material. For the sake of simplicity it will be assumed that these are the levels indicated in FIG. 1 as $W_1$, $W_2$ and $W_3$. In this material the population of $W_3$ is normally smaller than that of $W_2$, but is increased by irradiation of the material with a wave of "transition" frequency $f_{13}$. When the population of $W_3$ is larger than that of $W_2$, transitions take place between levels $W_3$ and $W_2$ which give rise to a radiation output of frequency $f_{23}$. Now $f_{23}$ is necessarily less than $f_{13}$. This means in practice that a high frequency is used to generate or amplify at a lower frequency. Obviously this is a serious limitation of the device for practical useful applications, particularly when the desired output wavelength is in the microwave range or even shorter. This limitation is overcome in maser devices according to the present invention.

Turning now to FIG. 2, this is a diagrammatic representation of a maser device in accordance with the present invention and adapted to serve as an oscillator. In this figure, there is indicated at 1 a body of crystalline material disposed in a cavity resonator 2. As illustrated conventionally in FIG. 1 the body 1 has at least four quantum-transition energy levels indicated respectively by the lines $W_1$, $W_2$, $W_3$ and $W_4$, the magnitude of the energy level increasing sequentially from $W_1$ to $W_4$. These levels are such that energy transition is permissible between any pair of these states when the body is irradiated by or emits electromagnetic wave energy of suitable frequency for that pair i.e. wave energy whose frequency is proportional to the magnitude difference between the two levels in question. In the present embodiment the pairs with which we are concerned are $W_1$ and $W_3$, with transition frequency $f_{13}$; $W_3$ and $W_4$, with transition frequency $f_{34}$; and $W_2$ and $W_4$, with transition frequency $f_{24}$.

Cavity resonator 2 is dimensioned and constructed, in accordance with any convenient known technique, so as to resonate at each of the three above-mentioned transition frequencies $f_{13}$, $f_{34}$ and $f_{24}$, and is coupled to waveguides 3, 4 and 5 via respective coupling apertures indicated generally at 6, 7 and 8. It is to be understood that the details such as shape, size and position of the coupling apertures will be determined according to the desired wave modes in the respective guides and in the cavity resonator. Each of the waveguides 3, 4 and 5 is provided with a pair of impedance matching screws as indicated at 9, 10 and 11 respectively. Continuous wave input energy of frequency substantially equal to $f_{13}$ is fed from a source (not shown) over waveguide 3 to excite cavity resonator 2 via coupling aperture 6 so as to irradiate the body 1. In addition, continuous wave input energy of frequency substantially equal to $f_{34}$ is fed simultaneously from another source (not shown) over waveguide 4 to excite cavity resonator 2 via coupling aperture 7 so as to irradiate body 1. The continuous wave sources just mentioned may be of any convenient known type, for example, klystron oscillator arrangements adapted to generate the required frequency either directly or with the aid of frequency multipliers. The stimulated emission of radiation of frequency $f_{24}$ resulting from the simultaneous irradiation of body 1 at frequencies $f_{13}$ and $f_{34}$ as above mentioned excites the cavity resonator which delivers output of frequency $f_{24}$ over output waveguide 5 via coupling aperture 8. By choosing energy levels such that $W_2$ is closer to $W_1$ than to $W_3$, the output frequency $f_{24}$ can be greater than either of the input frequencies $f_{13}$ and $f_{34}$.

In the present embodiment the crystalline body 1 comprises a paramagnetic material, gadolinium, homogeneously dispersed throughout a host lattice of lanthanum ethyl sulphate, and is biassed magnetically, by means not shown, by a static linear magnetic field H oriented as indicated by the arrow-headed line 12 in a direction perpendicular to that of the magnetic vector $h$ of the irradiation to which the body 1 is subjected. The magnitude of the magnetic biassing field is of the order of some thousand gauss, but should be adjustable (together with the orientation if necessary) to effect a fine control of the spacing between the molecular energy levels in use.

The embodiment further comprises a cryostat means 13 utilising liquid helium 14 for holding the gadolinium containing crystalline body 1 at a low operating temperature which will ensure a sufficiently long molecular relaxation time, and a low noise level.

While in the above-described embodiment the irradiated body 1 is gadolinium in lanthanum ethyl sulphate, a number of other substances with suitable quantum-transition energy levels are known, see for example the articles by W. Low, "Phys. Rev.," vol. 105, p. 793 (1957), and "Phys. Rev.," vol. 105, p. 801 (1957); also the article by J. E. Wertz and P. Auzins, "Phys. Rev.," vol. 106, p. 485 (1957).

While the maser device illustrated in FIG. 2 is shown as an oscillator, it will be obvious that it can also be used as an amplifier for energy at the frequency $f_{24}$, in which case the energy to be amplified is fed into the cavity resonator 2 via a directional coupler (not shown) which is mounted on waveguide 5.

While the invention has been described above in connection with a particular embodiment it is to be understood that such description is made only by way of example, and not as a limitation on the scope of the invention.

What we claim is:

1. A maser device comprising a body of crystalline material having four quantum-transition energy levels denoted in increasing order of magnitude by $W_1$, $W_2$, $W_3$ and $W_4$ respectively, with the transition frequencies between levels $W_1$ and $W_3$, between levels $W_3$ and $W_4$, and between $W_2$ and $W_4$ denoted by $f_{13}$, $f_{34}$ and $f_{24}$ respectively, a cavity resonator wherein said body is disposed for irradiation by wave energy, said cavity resonator being adapted to resonate at each of said transition frequencies, continuous wave means for exciting said cavity resonator in such manner as to irradiate said body simultaneously at both frequencies $f_{13}$ and $f_{34}$, leaving energy level $W_2$ unaffected and maintained at a level at which the frequency $f_{24}$ is greater than frequencies $f_{13}$ or $f_{34}$, whereby to stimulate emission of radiation energy by said body at frequency $f_{24}$, and output feeder means adapted to select the $f_{24}$ wave energy from said cavity resonator.

2. A device according to claim 1, in which said material includes a paramagnetic component, and which further comprises means for magnetically biassing said body by a static linear magnetic field adjustable in magnitude and orientation to control the spacing between said energy levels.

References Cited in the file of this patent

UNITED STATES PATENTS 2,909,654 Bloembergen ---------- Oct. 20, 1959